UNITED STATES PATENT OFFICE.

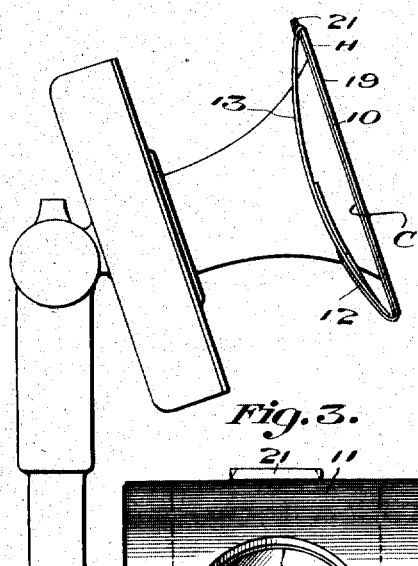
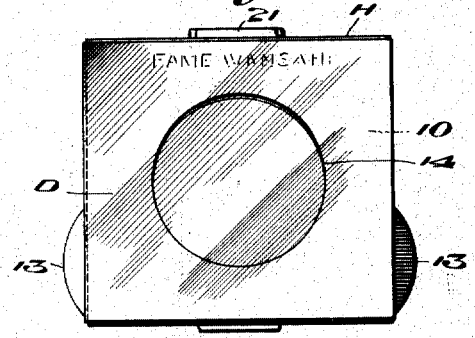
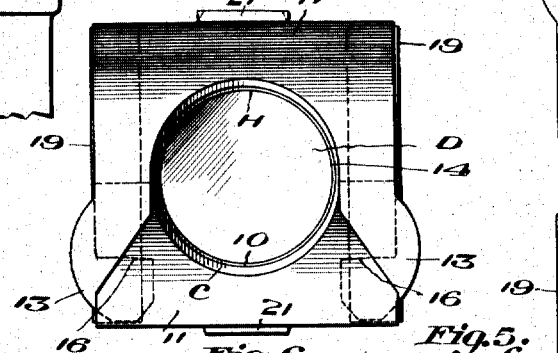
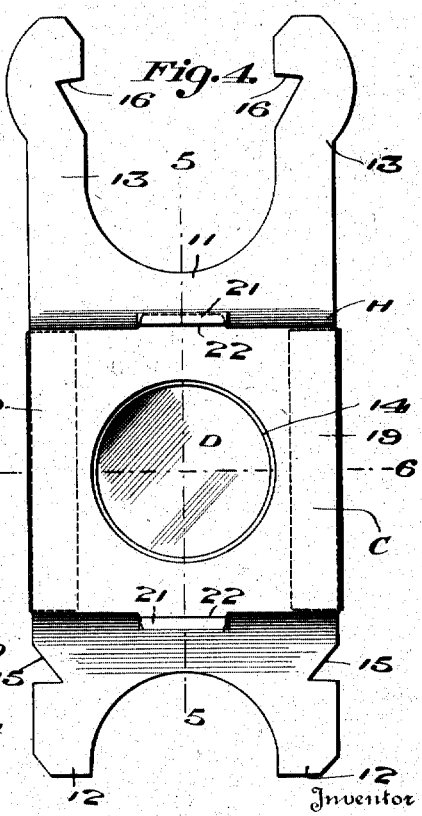
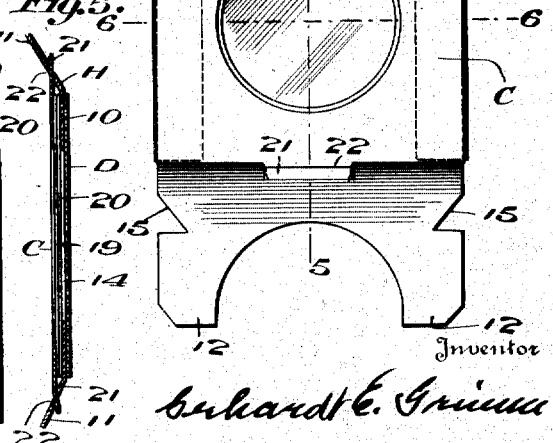
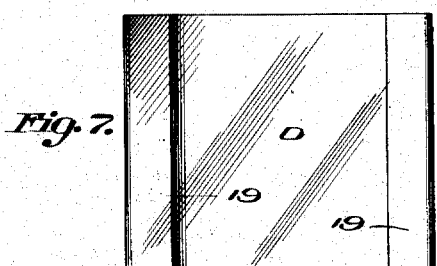

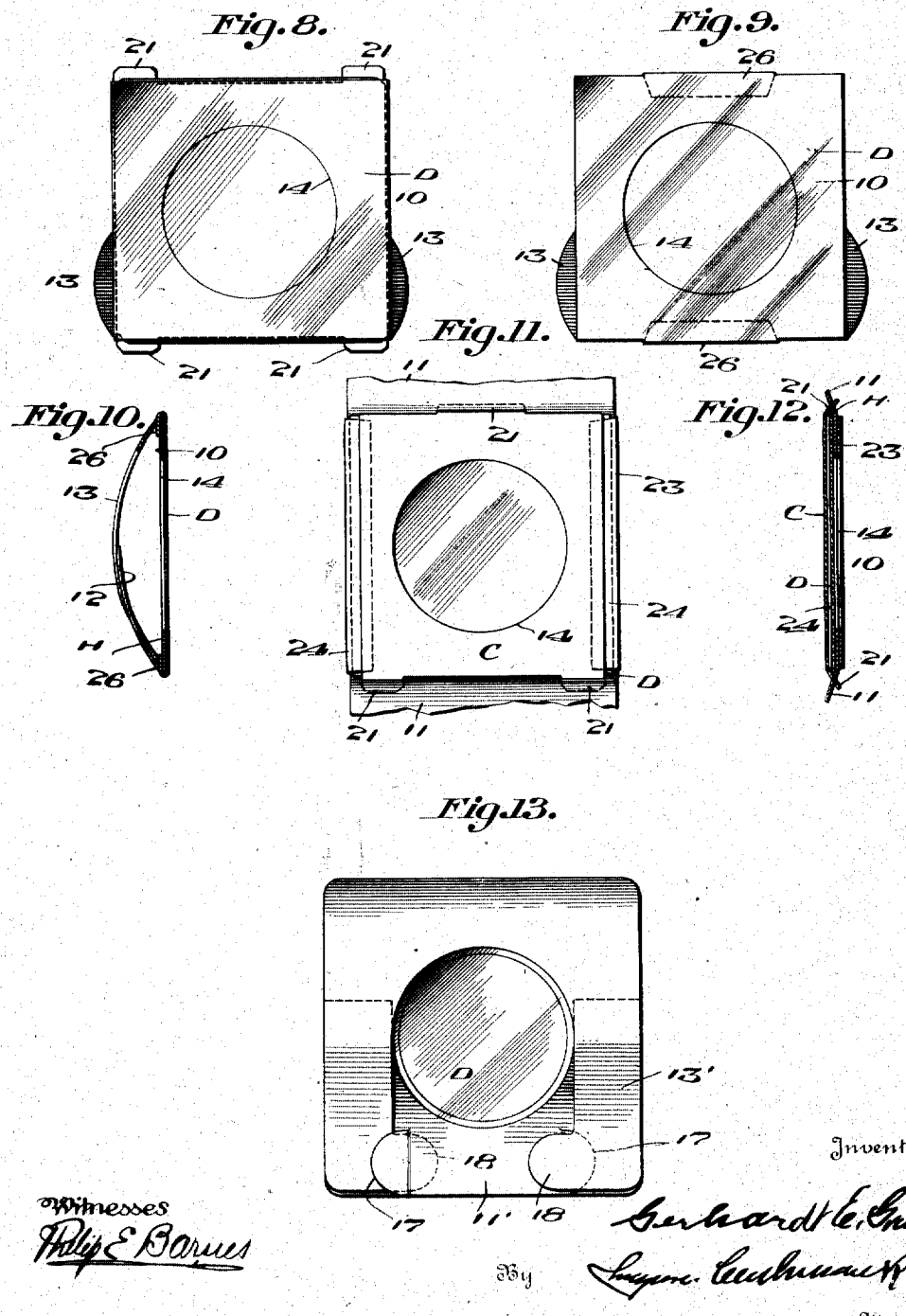

GERHARDT E. GRIMM, OF COLLINGSWOOD, NEW JERSEY.

SANITARY TELEPHONE ATTACHMENT.

1,280,016. Specification of Letters Patent. Patented Sept. 24, 1918.

Application filed January 2, 1917. Serial No. 140,211.

*To all whom it may concern:*

Be it known that I, GERHARDT E. GRIMM, a citizen of the United States, residing at Collingswood, in the county of Camden and State of New Jersey, have invented new and useful Improvements in Sanitary Telephone Attachments, of which the following is a specification.

This invention relates to attachments for telephone mouth pieces, and has particular reference to an antiseptic attachment adapted to be connected to the transmitter of the telephone for the purpose of guarding against contagion of diseases by preventing germs or bacteria from lodging and forming a culture ground on the mouth piece, and thus a person using the transmitter is not exposed to the danger of contracting a disease by coming into contact with a surface which is contaminated with contagious germs.

My invention has as its object to provide an antiseptic device for telephone mouthpieces which may be manufactured and sold at a relatively low cost, and which may be quickly and readily applied to the mouth pieces in such manner that it cannot become jarred or accidentally knocked from position. My improved attachment is adapted to be folded in such manner that it is comparatively flat so that it occupies but relatively small space, and when shipping the same a large number may be packed in a box with the attachments superposed upon each other. The attachment is provided with an easily removable antiseptic diaphragm so that the main portion of the device, which serves as a holder for the diaphragm, may be repeatedly used, it being merely necessary to keep the device in a satisfactory condition, to remove the diaphragm from the holder, and discard the diaphragm at regular intervals, or when it has become soiled or contaminated with bacteria.

My attachment as shown in the several illustrative embodiments herein described comprises, generally, a holder having a front or main section and interlocking fingers or flaps which, when in locked position, are bowed or swelled outwardly so as to permit the front section of the attachment to abut against the front edge of the mouth piece of the transmitter, and the fingers of the holder to engage about the converging sides of the mouth piece, and an antiseptic diaphragm preferably of tissue which is removably secured to the holder. If desired, a retaining card may be employed for maintaining the diaphragm upon the holder.

In the drawings, I have illustrated several embodiments of my invention, but it is to be understood that this showing is by way of illustration only, and is not restrictive of my invention, for my invention is susceptible of various modifications and changes which would be within the spirit of the invention without departing from the scope of the appended claims.

In said drawings,—

Figure 1 is a side elevation of so much of a telephone transmitter as is necessary to illustrate my improved attachment in position thereon.

Fig. 2 is a front view of one form of my attachment.

Fig. 3 is a rear view of the attachment shown in Fig. 2, the fingers for securing the attachment to the mouth piece of the telephone being shown in locked position.

Fig. 4 is an inside view of the attachment shown in Fig. 2, with the locking fingers in open position.

Fig. 5 is a sectional view taken on line 5—5, Fig. 4.

Fig. 6 is a transverse sectional view taken on line 6—6, Fig. 4.

Fig. 7 is a view of the removable diaphragm with its side edges folded over.

Fig. 8 is a view similar to Fig. 2, but discloses a slightly different construction.

Fig. 9 is a front view of another embodiment of my invention.

Fig. 10 is a vertical sectional view taken centrally through Fig. 9.

Fig. 11 is an inside view showing another embodiment of my invention, the holder being opened out, and the fingers being broken away.

Fig. 12 is a sectional view taken vertically and centrally through Fig. 11.

Fig. 13 is a rear view of another form of holder, one pair or set of fingers being shown in locked position.

Referring to the drawings by characters, like characters representing like parts in the several views, H designates the holder which comprises a blank of suitable material, preferably heavy paper or cardboard, cut to the configuration shown in Fig. 4, and folded along transverse lines to provide a front or main section 10 adapted to engage against the front or forward edge of the mouth piece and end flaps 11, one of the flaps having a pair of relatively short locking fingers 12, and the other a pair of relatively long locking fingers 13. The front section has a central opening 14 which is adapted to lie over the opening of the mouth piece, so that the transmission of sound waves to the receiver is not interfered with by the holder. The flaps 11 and the respective fingers 12 and 13 form yokes which, when the fingers are interlocked, embrace the mouth piece in such manner that the device is securely attached thereto.

In Figs. 1 to 10, the short fingers 12 are disclosed as having notches 15 on their outer edges, and the longer fingers 13 have, adjacent their free ends, and in their inner or opposed edges, notches 16, the construction being such that the notches of one pair of fingers are adapted to register with the notches of the other set for the purpose of interlocking the fingers, and preferably the ends of the longer fingers beyond the notches 16 are positioned beneath the flap 11 of the shorter yoke so as to provide a more effective lock.

In the embodiment disclosed in Fig. 13 is illustrated a slightly different form of locking means in that the yoke-like flap 11′ at one end of the front section is provided with curved slots 17, which correspond to notches 15 in the short fingers shown in the preceding figures, and these slots are adapted to receive the inwardly projecting ears 18 on the free ends of the long fingers 13′. In this figure, the fingers on the left-hand side are shown in locked position, but for the purposes of illustration, the ear 18 on the right-hand finger 13′ is shown as overlying the slot 17.

It is preferable that the locking yokes, when the fingers 12 and 13 of the embodiments shown in Figs. 1 to 10 are interlocked, or the ears 18 engage in the slots 17 in the embodiment shown in Fig. 13, bulge outwardly, so that the front section 10 of the holder may be positioned flatwise against the front edge of the mouth piece, and the locking yokes encircle the converging walls of the mouth-piece. The forward end of the mouth-piece is thus received between the yokes and the front section of the holder, and by this arrangement, displacement of the attachment upon the mouth-piece is guarded against.

In the embodiments shown in Figs. 1 to 10, I accomplish the bulging of the yokes by making the distance between the notches 16 in the long fingers and the line on which the long yoke is folded greater than the distance between the notches 15 of the short yoke when this yoke is folded over the short section, and the line on which the longer yoke is folded; while in Fig. 13, the long fingers 13′ are greater in length than the distance between the slits 17 when the lower yoke is bent over the section 10 and the line on which the longer yoke is attached to the front section.

It will be noted that in the several embodiments, the combined length of the fingers between the lines on which the yokes are folded over and the point at which they are interlocked is greater than the longitudinal dimension of the front section. Preferably, the longer fingers are of greater length than the front section 10.

Adapted to be positioned over the central opening in the front section 10 of the holder H is an antiseptic diaphragm, designated generally by the letter D, which diaphragm is of any suitable relatively flexible and thin material, glazed or finished tissue paper being preferable, as it may be obtained at a relatively low cost, and as it is relatively smooth, it will not be easily contaminated, or become soiled. The tissue diaphragm will give a neat and clean appearance to the device, and, if desired, the front or main section 10 may be provided with a suitable advertisement or legend which may be observed through the diaphragm. I have found that the transmission of sound is not materially interfered with by interposing the diaphragm between the speaker and the wave responsive mechanism of the telephone, for the tissue diaphragm will vibrate to correctly transmit the sound waves received by it to the transmitter.

The diaphragm D may be removably secured to the holder H in a variety of ways, and as illustrative of the various changes which may be made in my attachment, I have shown several different forms of attaching means. In Figs. 1 to 8 the diaphragm D comprises a sheet of tissue paper having side folds or flaps 19 which may be strengthened, as shown in Fig. 6, with strips 20 of paper or other suitable thin but stiff material. The body portion of the diaphragm is preferably coextensive in area with the front section of the holder, so as to completely cover this portion of the holder, and the flaps 19 are folded about the side edges of the front section.

To retain the flaps 19 against withdrawal from around the side edges of the holder H, I provide, as shown in Figs. 1 to 8, 11 and 12, a retaining card C, which comprises a flat sheet of relatively stiff material, such as thick paper, or thin cardboard, and this sheet is of substantially the same size as the front section of the holder. The card C is provided with a central opening which is adapted to register with the opening 14 of the holder, and it is further provided with tabs 21 at its opposite ends which engage in notches or slots 22 cut in the holder H preferably along the lines on which the yokes 11 are folded over. In Figs. 1 to 5, the card C has one tab at each end; in Fig. 8, it has two tabs at each end; while in Fig. 11, the card is disclosed as having two tabs at its lower end, and one at its upper end or edge, but it is, of course, to be understood that any number of tabs may be used, and any suitable combination of tabs may be employed. The apertures 22 in the holder should correspond, of course, with the number of tabs on the card.

When the embodiments of my invention illustrated in Figs. 1 to 8 are employed, the diaphragm D is positioned on the front face of the main section 10 of the holder H with the flaps 19 about the side edges of the section 10. The card is positioned against the inner face of the main section 10 with the tabs 21 engaging in the respective apertures 22 in the holder, and the flaps 19 are interposed and clamped between the holder H and the card C. It will thus be seen that a soiled or contaminated diaphragm may be easily replaced with a new one, it being merely necessary to remove the attachment from the mouth-piece by withdrawing the fingers from locked position, remove the card C and soiled diaphragm, position a new diaphragm upon the front face of the main section, and then insert the card in position. If desired, the flaps 19 of the diaphragm may be inserted between the front section and the card without removing the latter from the holder, the holder and card being flexible enough to permit this operation.

In the embodiment shown in Figs. 9 and 10 the card C is dispensed with, and the diaphragm D is illustrated as having end flaps or tabs 26, which tabs or flaps are adapted to engage in the apertures 22 of the holder.

In Figs. 11 and 12, I have shown the diaphragm D as comprising a rectangular sheet of tissue devoid of tabs and positioned between the front section 10 of the holder and the card C. The card C, in this instance, has two tabs 21 at its lower end, and one tab at its upper end, which tabs are adapted to engage in the notches or slots in the holder. Positioned over the front face of the main section 10 of the holder is a cover 23 of celluloid or other suitable smooth material, the cover having side flaps 24 embracing the edges of the front section, and the edges of the diaphragm D are positioned under the side flaps 24 of the cover. The side flaps 24 are adapted to be inserted between the card C and the holder H, so that the cover is maintained against displacement. The celluloid cover has a central opening which is adapted to register with the openings in the holder and card, so that the transmission of sound is not interfered with. It is, of course, to be understood that the cover 23 may be of any suitable material, but, preferably, the same is composed of white celluloid, as this lends a neat appearance to the attachment, and the celluloid cover may be washed or cleansed whenever desired.

What I claim as new is:

1. An attachment for telephones having a holder comprising a main section adapted to engage against the front edge of the telephone mouth piece and fingers connected to the opposite ends of the main section, the fingers at one end of the main section being adapted to interlock with the fingers at the other end.

2. An attachment for telephones comprising a holder having a main section provided with yokes at its opposite ends, the yokes at one end of the main section being adapted to interlock with the fingers at the other end, the yokes when interlocked being adapted to bulge away from the holder so as to embrace the walls of the mouth-piece of the telephone transmitter; and a diaphragm attached to said holder.

3. An attachment for telephones comprising a holder having a main section, relatively long fingers at one end, and relatively short fingers at the other end, said fingers having notches the location of which is such that the combined length of the fingers between the notches and the fixed end of the fingers is greater than the length of the holder so that said fingers when interlocked bulge away from the holder to embrace the walls of the mouth-piece of the telephone transmitter.

4. An attachment for telephones comprising a holder, a flexible diaphragm having tabs or flaps on its opposite edges adapted to engage about the edges of the holder, and means for securing the holder to the telephone mouth-piece.

5. An attachment for telephones comprising a holder having slots, a member having tabs adapted to engage in said slots, and means for securing the holder to the mouth-piece of the telephone.

6. An attachment for telephones comprising a holder, a removable diaphragm on the holder, a retaining card adapted to be secured to the holder and clamp the diaphragm in position thereon, and locking means for securing the holder to the mouth-piece.

7. An attachment for telephones comprising, a holder having apertures, a removable diaphragm, a retaining card having tabs adapted to engage in the apertures of the holder for securing the diaphragm in position, and locking means for securing the attachment to a telephone mouth-piece.

8. An attachment for telephones, comprising a holder, a removable member having its ends folded over to provide side flaps which embrace the side edges of the holder, and means on the holder for securing the attachment to the mouth-piece of the telephone.

9. An attachment for telephones comprising, a holder having a main section provided with a central opening and end yokes provided with fingers, said fingers having interlocking notches so located that the fingers bulge outwardly when interlocked; and said holder having slots; a removable diaphragm having side flaps adapted to engage about the side edges of the main section; and a retaining card having tabs for engagement in the slots of said holder, said card being adapted to clamp the side flaps of the diaphragm between the card and the holder.

In testimony whereof I have hereunto set my hand in presence of two subscribing witnesses.

GERHARDT E. GRIMM.

Witnesses:
J. K. SATTERTHWAITE,
A. B. SHEIP.